United States Patent [19]

Brown et al.

[11] Patent Number: 4,990,248
[45] Date of Patent: Feb. 5, 1991

[54] REVERSE OSMOSIS APPARATUS

[75] Inventors: Barry M. Brown, Baldwinsville; Evan A. Edwards, Pittsford; Joseph C. Holzer, Liverpool, all of N.Y.; Augustine Pavel, Fallbrook, Calif.; Frederick Tone, Holley; Henry L. West, Rochester, both of N.Y.

[73] Assignee: Eastman Kodak Company, Rochester, N.Y.

[21] Appl. No.: 208,817

[22] Filed: Jun. 16, 1988

Related U.S. Application Data

[63] Continuation-in-part of Ser. No. 57,545, Jun. 3, 1987, abandoned.

[51] Int. Cl.[5] ............................................. B01D 61/08
[52] U.S. Cl. ..................................... 210/136; 210/317; 210/336; 210/321.74
[58] Field of Search ...................... 210/315, 317, 494.1, 210/335, 336, 321.74, 136, 321.83

[56] References Cited

U.S. PATENT DOCUMENTS

| | | | |
|---|---|---|---|
| 2,736,436 | 2/1956 | Fresch | 210/494.1 X |
| 3,456,803 | 7/1969 | Rak | 210/177 |
| 3,504,796 | 4/1970 | Bray | 210/137 |
| 3,542,119 | 11/1970 | Bray et al. | 210/116 |
| 3,726,407 | 4/1973 | Weyand | 210/435 |
| 3,789,993 | 2/1974 | Brown et al. | 210/500 |
| 3,792,135 | 2/1974 | Brown et al. | 264/41 |
| 3,824,299 | 7/1974 | Brown et al. | 264/41 |
| 4,218,317 | 8/1980 | Kirschmann | 210/117 |

Primary Examiner—Frank Spear
Attorney, Agent, or Firm—John B. Turner

[57] ABSTRACT

A water filter cartridge includes a reverse osmosis membrane permeator spirally wound on a central winding tube and surrounded by an impermeable barrier layer which is, in turn, surrounded by a spirally wound prefilter. A post-filter is placed centrally within the winding tube. The cartridge is designed for functional installation in a housing tube fastened and sealed to a valve plate at a first end and closed by a removable end cap at the other, second end. Feed water enters the cartridge through an inlet port in the valve plate at the first end at an outer radius to pass lengthwise in prefilter. Prefiltered water returns from the second end lengthwise through the reverse osmosis permeator to a waste-water outlet port in the valve plate at an intermediate radius. Product water which has permeated through the membrane flows inwardly through holes in the winding tube and into a clearance space surrounding the central post-filter. After traveling to the second end in the clearance space, the permeate flows through the length of the post-filter to a purified-water outlet port at an inner radius in the valve plate. The reverse osmosis membrane cartridge is axially removable from the housing tube for ease of replacement of the cartridge unit without disturbing any piping connections.

8 Claims, 5 Drawing Sheets

REVERSE OSMOSIS APPARATUS

CROSS-REFERENCE TO RELATED APPLICATION

This application is a continuation-in-part of U.S Pat. Application Ser. No. 07/057,545 entitled Reverse Osmosis Apparatus, filed June 3, 1987 and now abandoned. The application is also related to U.S. Patent Application Ser. No 07/195,560 entitled Water Purification System, filed May 18, 1988, which is a continuation in part of U.S Pat. Application Ser. No. 07/057,463 entitled Water Purification System, filed June 3, 1987, now abandoned.

BACKGROUND OF THE INVENTION

1. Field of the Invention

This invention relates to systems for producing purified water from feed water, and more particularly to a filter cartridge including a reverse osmosis filter, and to water filtration apparatus including such a filter.

2. Description of the Prior Art

Drinking-water purification systems have found increasing use in the home and the work place to improve the quality of tap water for drinking, cooking, ice-making and the like. "Reverse osmosis processes" are a known class of processes in general use in these systems. The processes employ "reverse osmosis membranes" which are selectively impermeable to dissolved salts in aqueous solution. Some prior-art purification systems include, in addition to the reverse osmosis membrane permeator, a prefilter for initial screening of the feed water, removing particulate matter to prevent clogging and to protect the membrane, and a post-filter for further purification, especially for the removal of organics such as dissolved hydrocarbons. In general, in these systems feed water, usually in the form of tap water, is filtered and separated as purified product water and waste water.

Reverse osmosis membrane permeators constitute a major restriction to the flow of water through these purification systems, and so the filtration process is relatively slow. Therefore, a system which is economically and aesthetically practical for the home is generally unable to generate product water on demand but must include a product water storage reservoir. Pressures within the system require control to optimize the system operation. Finally, waste water must be disposed of.

While a water-purification system will include a control-valve subsystem, a reverse osmosis filtration apparatus and a product water reservoir, this invention is directed to a cartridge and filtration apparatus including such a cartridge.

The prior art includes U.S. Pat. No. 3,789,993, 3,792,135 and 3,824,299 to Brown and Ray. These patents disclose the specifics of composition and manufacture of reverse osmosis membrane permeators which may be used in embodiments of this invention. The prior art also includes U.S. Pat. No. 3,504,796 and 3,542,199 to Bray, which disclose a particular configuration and combination of prefilter, membrane permeator and post-filter in a water-purification system. These prior-art items are background to this invention and are incorporated by reference herein.

The reverse osmosis water purification unit described in U.S. Pat. Specification No. 3,542,199 has the disadvantages that connections to it have to be broken when it is necessary to change filter components, for example, when they are exhausted, and remade after the substitution of new filter components. Obviously, at least from the aspect of domestic usage, the need for breaking and remaking of connections is very unattractive to potential purchasers, very undesirable to existing owners and may have tragic consequences.

U.S. Pat. Specification No. 4,218,317 describes a water purifier which is intended to stand on a counter top. It has flexible hose connections for supply of feedwater, for waste water to drain and for purified water. Two connections are at one end of the purifier housing and one connection is at the other end of the housing. The housing is formed by two housing parts which screw-threadedly engage one another at the middle of the length of the housing. Thus, while connections do not have to be broken and remade when changing filter cartridges, because they are flexible, the connections do have to be flexible if breaking and remaking connections are to be avoided, and flexible hoses are undesirable from the viewpoint of longtime trouble-free service.

It is an object of the present invention to render it unnecessary to break and remake connections when changing a filter cartridge or to use flexible connections.

SUMMARY OF THE INVENTION

The present invention overcomes the problems of the prior art by providing a water filter cartridge including a prefilter, a reverse osmosis filter and a post-filter, which is suitable for use in an apparatus in which all the connections are made at one end and which does not require the breaking and remaking of water pipe connections when it is necessary to replace an exhausted filter cartridge with a new one.

A water filter cartridge in accordance with the present invention has first and second ends and includes a prefilter of annular form adapted for flow of feed water generally axially therethrough from the first end to the second end. There is a tubular impermeable barrier surrounding the outer surface of the prefilter. A reverse osmosis filter, incorporated in the cartridge, includes a membrane wound on a winding tube through which permeate may pass to the interior of the winding tube. An impermeable barrier layer surrounds the outer surface of the membrane. The reverse osmosis filter is of annular form in section and is disposed radially within the prefilter. The cartridge further includes a post-filter comprising granular filter material disposed radially within the reverse osmosis filter. Also, there are means for leading permeate to the granular filter material at the second end. The arrangement of the cartridge is such that feed-water which enters the prefilter at the first end may leave the prefilter at the second end and may thereafter enter the reverse osmosis filter at the second end. Waste water leaves the reverse osmosis filter at the first end and permeate, after passing through the winding tube and passing to said post-filter at the second end, leaves the post-filter at the first end.

In one embodiment of the present invention, the post-filter further includes a carrier tube within which the granular material is disposed Such an embodiment has the advantage that the post-filter may readily be changed without also changing the prefilter and the reverse osmosis filter.

There may be an annular space between the winding tube and the carrier tube for flow of permeate having passed through the winding tube, to the second end of the post-filter. There may be a seal between the carrier tube and the winding tube, so disposed as to prevent flow of permeate in the annular space to the first end.

The means for leading permeate to the granular material at the second end preferably includes a cap sealed to the winding tube at the second end. Also there may be a cap sealed to the second end of the carrier tube and a valve selectively allowing flow of permeate to the granular material.

In one advantageous embodiment of the invention, there is means at the first end of the cartridge sealed to the winding tube and the barrier layer surrounding the outer surface of the membrane for isolating feed water from waste water and waste water from permeate.

The present invention also provides water filtration apparatus including a cartridge as described in the preceding paragraph. Such apparatus includes a housing tube permanently closed at a first end by a valve plate and closed at the second end by a removable end cap. The valve plate has ports for connection to a feed-water supply, a drain and a connection to a reservoir for permeate. The apparatus also has means for cooperating with the means at the first end of the cartridge which are sealed to the winding tube and the barrier layer, whereby only feed-water can enter the prefilter and only permeate flows to the connection to a reservoir for permeate.

DESCRIPTION OF THE PREFERRED EMBODIMENT

Figure 1:
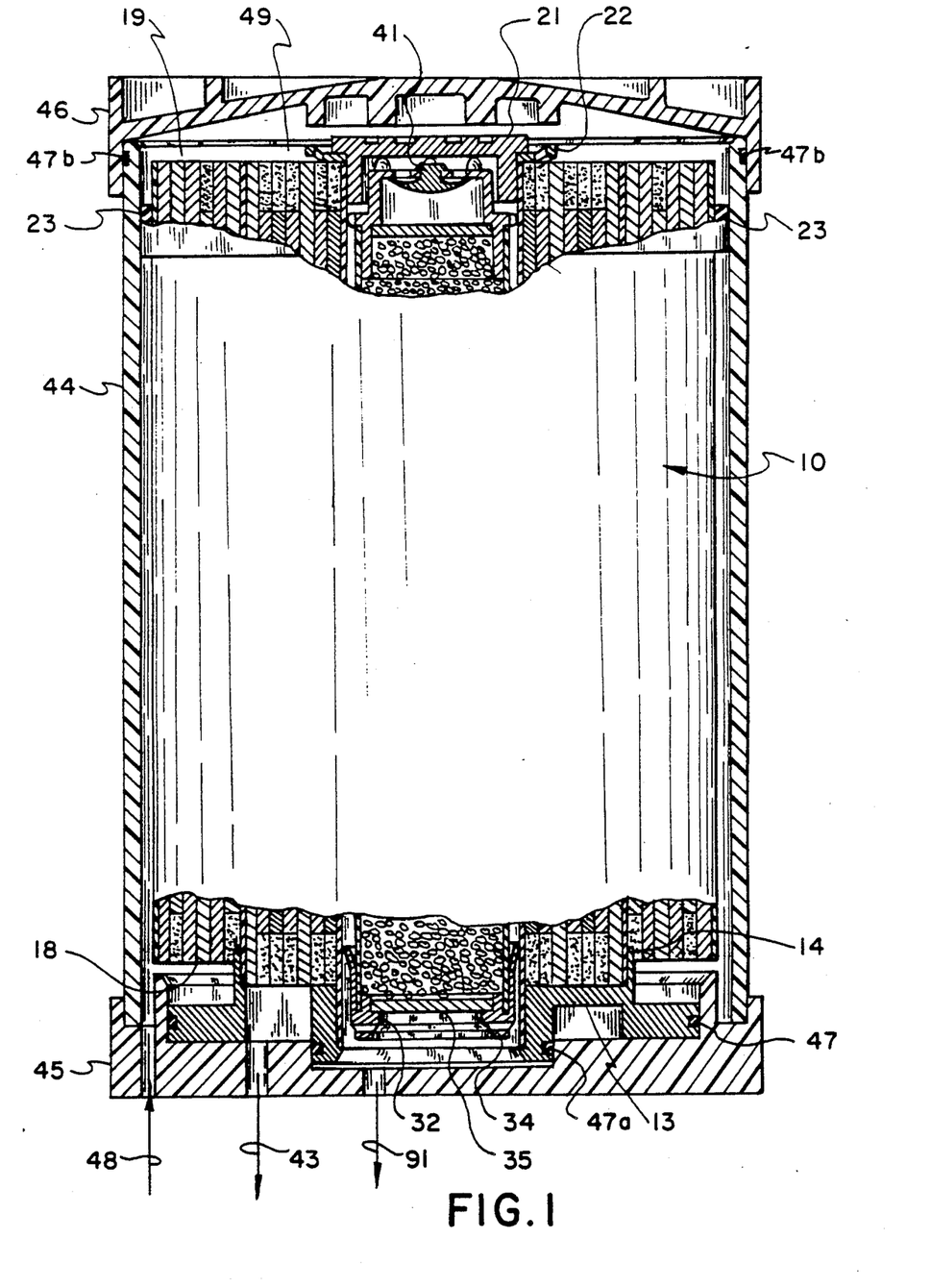
FIG. 1 shows the cartridge, in accordance with the present invention, mounted in a housing tube with a valve plate at one end and an end cap at the other end.
Figure 2:
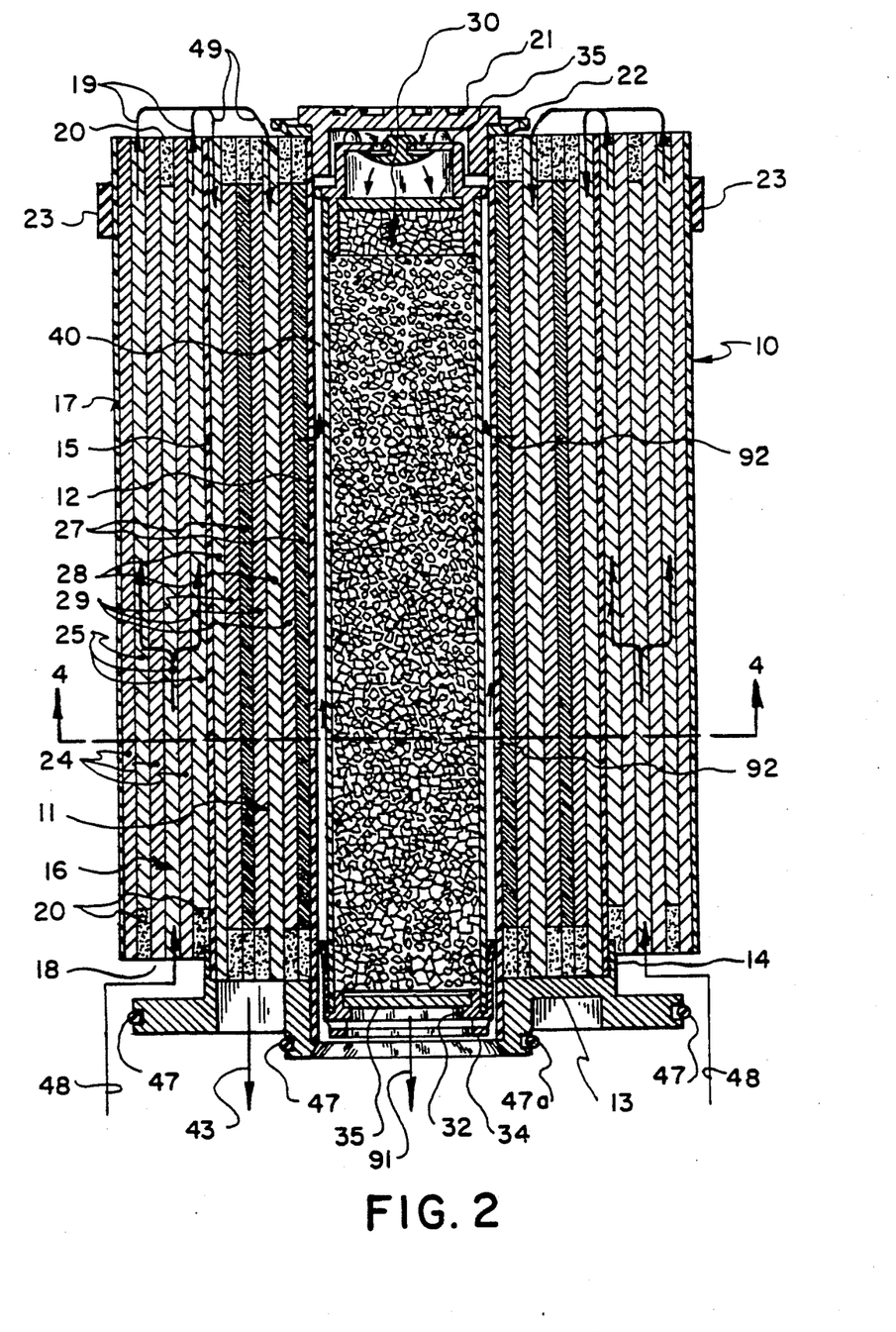
FIG. 2 shows in cross-section the reverse osmosis membrane cartridge, included in FIG. 1, in accordance with one preferred embodiment of this invention.
Figure 3:
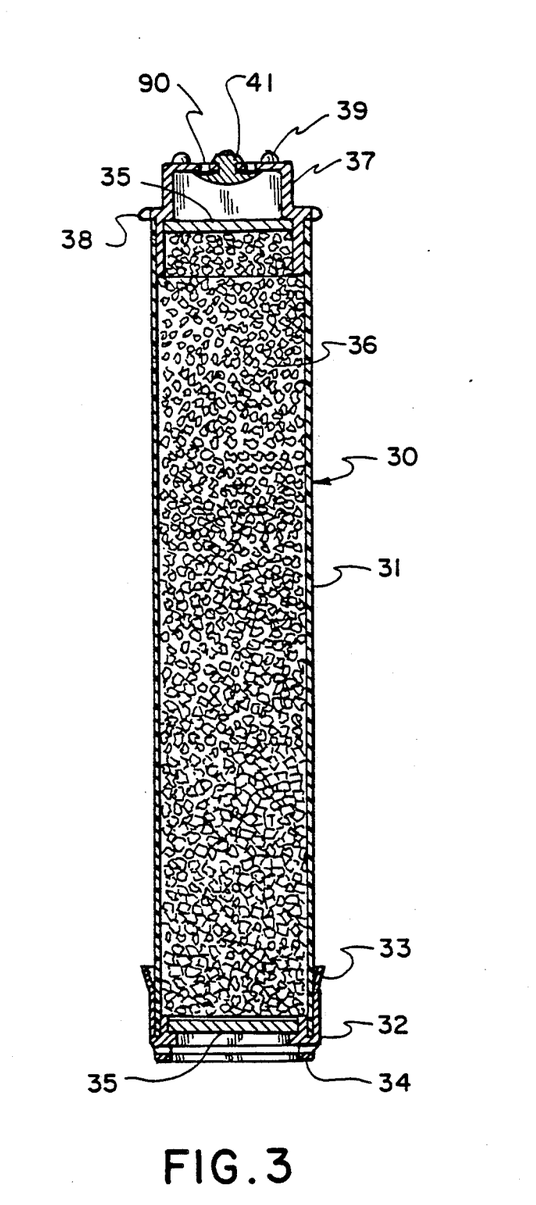
FIG. 3 shows in cross-section a post-filter prior to inserting it into the cartridge illustrated in FIG. 2.
Figure 4:
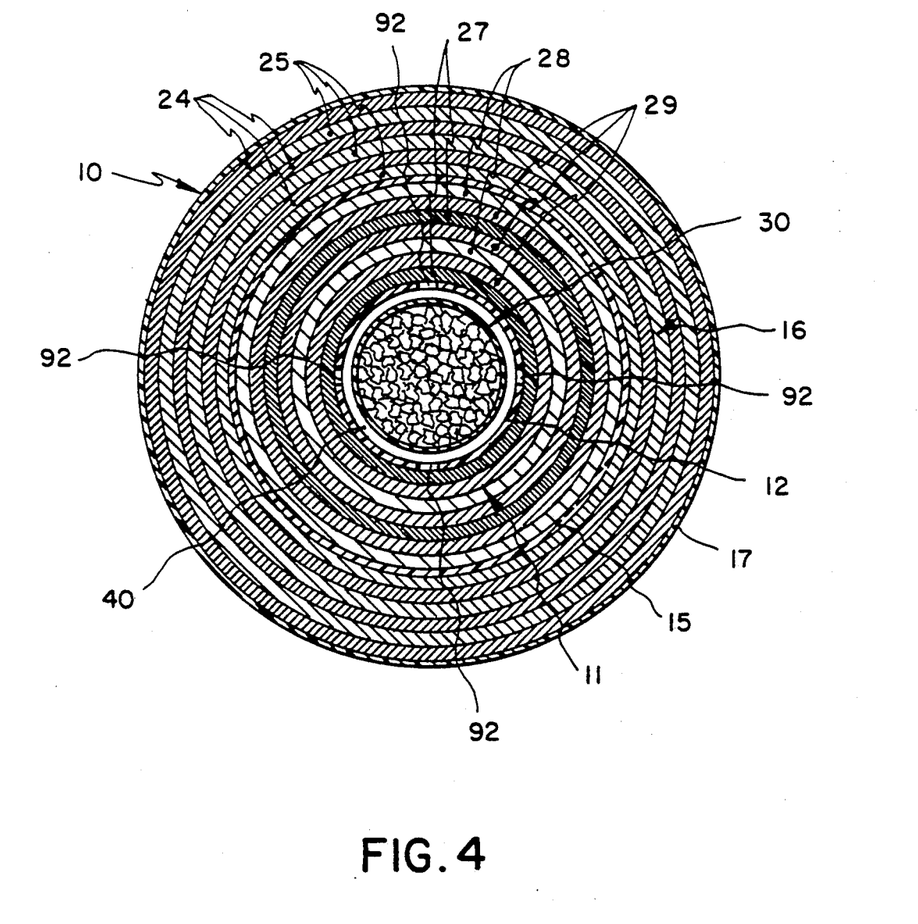
FIG. 4 shows a cross section of the cartridge unit of FIG. 2, taken along the line 4—4 in FIG. 2.

Referring particularly to FIGS. 1 through 3, the apparatus comprises a reverse osmosis cartridge indicated generally at 10, having first and second opposite ends, 8 and 9 respectively, and comprising a spirally wound prefilter 16, a reverse osmosis membrane permeator 11 having separating and spacer layers and a post-filter 30. FIG. 1 shows the reverse osmosis cartridge 10 installed in a housing including a housing tube 44 which is sealed at the bottom to lower valve plate 45. The housing tube 44 is closed at the top by a removable end cap 46. O-rings 47, or any other suitable ring sealing devices are used to make the housing, comprising valve plate 45, housing tube 44 and removable end cap 46, a watertight unit when water pressure is applied internally. The removable end cap 46 is preferably held in place by four tie rods and threaded nuts, not shown in FIG. 1 but, alternatively, screw threads, a bayonet arrangement or a snap-ring device may be adopted. Housing tube 44 may be fabricated of any material which will withstand the water pressure under which it will operate. Suitable plastic materials such as polyvinyl chloride, polyethylene or polypropylene may be used. For higher pressures, a high strength material may be required.

Referring now particularly to FIG. 2, separating and spacer layers included in the permeator 11, are spirally wound onto a winding tube 12. The separating and spacer layers are further comprised of the following wound construction. A layer of woven or nonwoven fabric 27 is first wound onto the winding tube 12. This layer is followed by a pack of spirally wound layers which include a spiral, loosely woven or nonwoven netting 28, a reverse osmosis membrane layer 29, a layer of porous fabric 27, a membrane layer 29, then a layer of woven or nonwoven netting 28. Fabric layer 27 serves to axially transport prefiltered water over the reverse osmosis membrane layers 29, to direct waste water out of the cartridge unit. Permeate passing through reverse osmosis layers 29 is transported in an inwardly spiral path by transport layer 27 through aperture 92 in the winding tube 12 to clearance space 40 and then to post-filter 30. Layers 27 and 29 are adhesively bonded along both edges of the layers in order to confine spiral flow of the liquid through said layers whereas the ends of layer 28 are open-ended to allow for prefilter water to flow both through membrane layer 29 and thus remove waste water from the unit.

An effective permeating surface area of the pack of spirally wound layers of membrane 11 can range from 0.3 to 1.90 square meters, and preferably is 0.56 square meter.

A mounting spoked wheel 13 is cemented onto the bottom end of winding tube 12. The spoked wheel 13 has a cylindrical rim extension 14 which is joined and sealed to the outside of a barrier layer 15. Outside of the barrier layer 15 is spirally wound a prefilter 16 comprising alternating spirals of filter media sheet and open-weave spacer sheet. By applying adhesive 20 alternately at opposite ends, as shown in FIG. 2, an axial flow with considerable filtering surface area is created. The prefilter 16 is then wrapped with an impermeable barrier layer 17, leaving both first and second end surfaces of the prefilter open for inlet feed water flow 18 at the first end 8 and subsequent water outlet flow 19 of prefiltered water at the second end 9. A cartridge cap 21 and a plastic pull ring 22, attached to the end cap and preferably molded from polypropylene material, are then cemented into the second end of the winding tube 12.

A cartridge external seal ring 23 of resilient material, covered with pliable tape, is disposed on the outside of the barrier layer 17 near the second end.

The cylindrical post-filter 30, shown in FIG. 3, is disposed inside the winding tube 12. The post-filter 30 is comprised of a carrier tube 31, made from a suitable impermeable plastic material and filled with carbon granules 36, which is closed at its bottom end, as shown in FIG. 3, by lip seal cap 32 having a radial lip seal 33. The lip seal cap 32 has a pull handle 34 on its outer side. Lip seal cap 32 also carries a porous disc 35 which functions to keep the carbon granules 36 within post-filter 30. The top end of the carrier tube 31 is closed with top spacer cap 37 which has, as one of its features, a plurality of radial projections 38 and axial projections 39 which insure a free flow path from collection space 40, surrounding the post-filter, to the upper, second end, as shown in FIG. 2, of the post-filter.

Also incorporated in the spacer cap 37 is an umbrella-type valve 41 inserted in a retaining hole in the center of the spacer cap 37 so that the umbrella skirt overlies a plurality of flow passage holes disposed in an annulus around the central retaining hole. The umbrella of the valve 61 is positioned on the inside of the cap 37 to permit flow into the spacer cap from the top side as shown in FIG. 2. Also in the spacer cap 37 is a porous disc 35' to retain the carbon granules 36.

In operation, the cartridge is connected to a suitable pressurized supply of water to be purified, by connection of feed water port 48 to a household feed-water supply, and to a product-water reservoir. The flow paths through the cartridge are as follows, all described with reference to FIGS. 2 and 3. Feed water flow 18 from the water supply is brought to a position radially outermost from the cartridge centerline, to enter the prefilter 16 at the first end 8 to pass upward, as shown in FIG. 2, between impermeable barrier layer 15 on the inside and impermeable barrier layer 17 on the outside, to exit the prefilter as flow 19 at second end 9. Because of the configuration of the adhesive 20, inlet flow 18 at the first end 8 can enter at an open edge of spacer sheet at one layer, but not at one layer above or below because these edges are filled with adhesive 20. Flow cannot pass straight through in the same open-weave spacer sheet because the top end of this channel is filled with adhesive 20 at the second end 9. The only flow path available is through the filter media sheet at each side of the spacer sheet, and then to the next open-weave spacer sheet just beyond which does not have adhesive at the second end.

Flow 19 exiting the prefilter 16 at the second end 9 can then pass around the upper end of impermeable barrier layer 15 to enter the upper end of reverse osmosis membrane permeator 11 where it is conducted downward through the spacer layer 20 and over the surface of the reverse osmosis membrane 29. A major portion of the flow exits the reverse osmosis membrane permeator 11 as waste flow 43 at the first end 8 at an intermediate radius from the cartridge centerline.

A minor portion of the water entering the reverse osmosis membrane permeator 11 is able to permeate through the membrane where it is conducted in an inwardly spiraling path, in a conducting sheet to the outer surface of the tube 12. The tube 12 contains a plurality of holes 92 which permit the permeate to enter the collection space 40 inside the tube 12 and outside the post-filter carrier tube 31. The permeate in the collection space 40 cannot flow downward because it is blocked by lip seal 33 on lip seal cap 32, shown in FIG. 3. The permeate therefore flows upward and through the space provided by radial projections 38 and axial projections 39 on spacer cap 37. Permeate above the spacer cap 37 passes through openings 90 in spacer cap 37 to the upper side, as shown in FIG. 2, of umbrella valve 41. Pressure from the flow can deflect the skirt to allow flow to continue downward through post-filter 30.

The purpose of the umbrella valve 41 is to isolate the feed-water which may remain in the collection space 40 and may deteriorate in quality during an extended period of shutdown. The volume of water in the collection space 40 is small, and the umbrella valve 41 protects the larger volume of the post-filter from deterioration.

As the permeate flows downward, as shown in FIG. 2, through the post-filter 30, it first passes through upper porous disc 35', then through the carbon granules 36, filling the carrier tube 31, and out the bottom, first end through the lower porous disc 35. The permeate is then free to leave the cartridge 10 at an inner radius 91 from the cartridge centerline. See FIG. 1.

To provide the proper seals to separate feed water at an outer most radius from waste water at an intermediate radius, O-ring 47, or other equivalent sealing ring, is placed in a groove in the spoked wheel 13. To separate the waste water at an intermediate radius from the product water at an inner radius, O-ring 47' is placed in another groove in the spoked wheel 13.

The reverse osmosis cartridge unit is now complete and ready for packaging as a replacement filter unit or for installation in a drinking-water system.

Referring again to FIG. 1, which shows the reverse osmosis cartridge unit 10 installed in housing tube 44, as described above, a supply of water is supplied into the cartridge unit 10 through feed water port 48 in valve plate 45 at an outer radius from the cartridge centerline.

Feed water is prevented from bypassing the prefilter 16 by compressible external seal ring 23 which engages the inside of the housing tube 44 at a short distance from its upper, second end, as shown in FIGS. 2 and 3.

Prefiltered water from the prefilter 16 is directed by the removable end cap 46 in a downward direction to enter the reverse osmosis membrane permeator 11 at annular surface area 49.

After flowing through a spacer layer and over the surface of the reverse osmosis membrane, the major portion of this flow exits the lower annular surface at waste-water outlet port 43 at an intermediate radius from the cartridge centerline.

A minor portion of the prefiltered water which has been able to permeate the membrane flows spirally inward to the holes 92 in the winding tube 12, upward in the clearance space 40 and then downward through the postfilter 30 to exit through valve plate 45 at permeate outlet port 91 at an inner radius from the cartridge centerline.

To change the reverse osmosis filter cartridge 10 in a drinking-water system, it is necessary only to take off the removable end cap 46, raise the pull ring 22 and pull out the cartridge 10. A fresh cartridge 10 is pushed into place in the housing tube 44. The new cartridge cannot be installed incorrectly. New O-ring seals 47 and 47' and external ring seal 23 are provided with each cartridge 10. The removable end cap 46 is now put back on the housing tube 44 and fastened in place. No piping or tubing connections need be disturbed or removed in order to install a replacement reverse osmosis cartridge 10 of the present invention.

Figure 5:
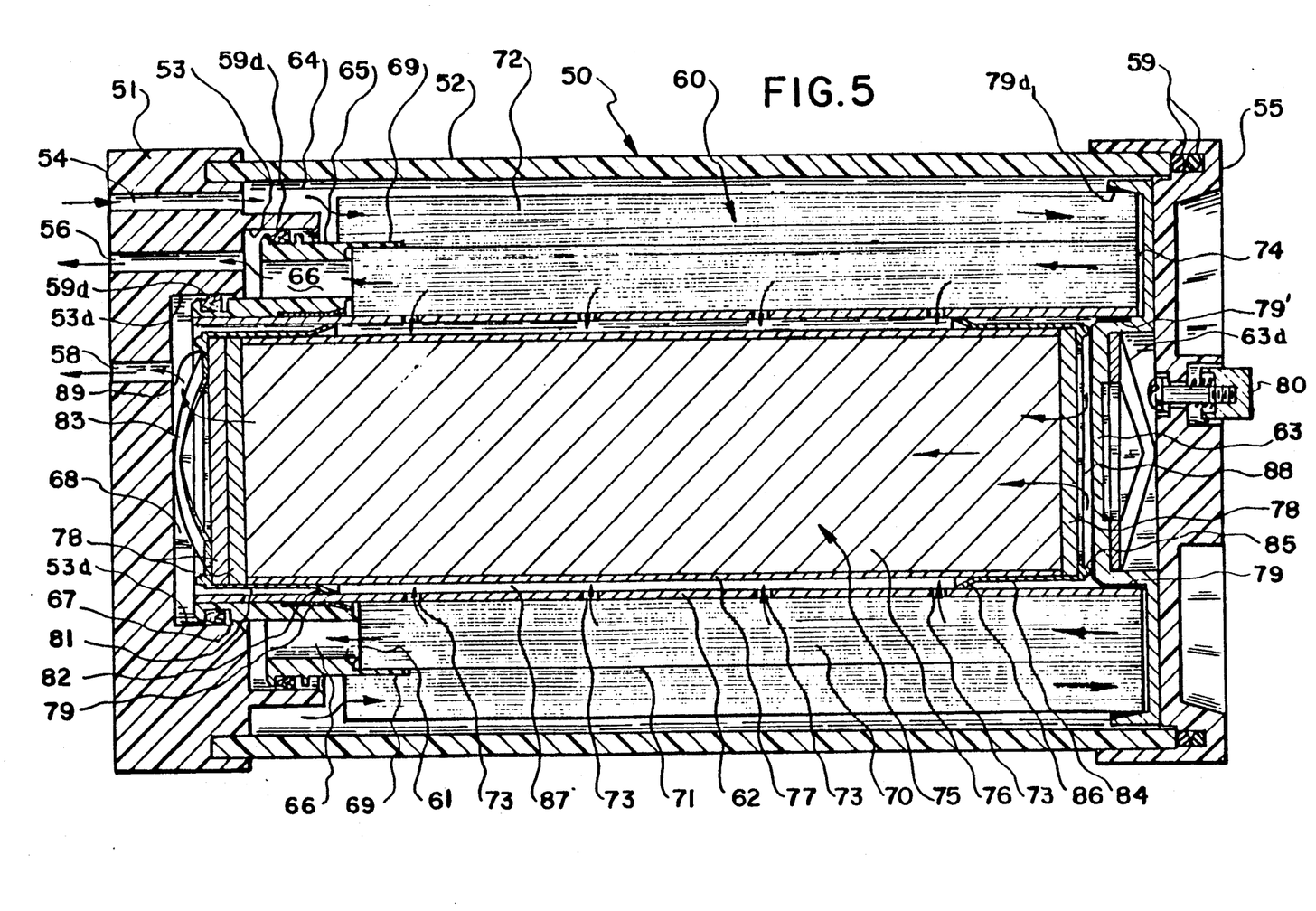
FIG. 5 shows a cartridge, according to another embodiment of this invention, mounted in a housing tube with a valve plate at one end and an end cap at the other end.

Referring now to FIG. 5, which illustrates another embodiment of the invention, a reverse osmosis filter apparatus 50 includes a cylindrical outer housing tube 52, integrally mounted on and extending axially from a mounting end plate 51 at a first end. The mounting end plate 51 is also the back plate of the associated control valve block to which this reverse osmosis filter unit is mounted, and may hereinafter in context be referred to as valve plate 51. The valve plate 51 includes a feed-water port 54, a waste-water port 56 and a product-water port 58. Valve plate 51 is configured to provide a pair of concentric cylindrical bearing surfaces 53. Housing tube 52 is closed at its other, second end by a removable end cap 55 which is sealed to the tube 52 by one or more O-rings 59. The end cap 55 may be mounted on housing tube 52 by several means, such as tie rods, a threaded engagement or a bayonet fit, for example.

There are also other sealing devices to effect sealing of end cap 55 on housing tube 52, which are well-known equivalents of 0-rings 59. End cap 55 optionally may include an air-vent fitting, shown at 80. The valve plate 51, outer housing tube 52 and removable end cap 55 are permanent parts of the reverse osmosis filter apparatus 50.

A removable and disposable filter cartridge 60 is shown enclosed within the housing tube 52. The filter cartridge 60 includes an inner permeator mounting tube 62 with a mounting spoke wheel 61 sealed and fixed on one, the first end of the mounting tube 62. A cartridge end cap 63 is sealed and fixed on the other, second end of the mounting tube 62. A suitable adhesive, or other bonding means, forms the bond and seal 79 between the tube 62 and the wheel 61 and between the tube 62 and the cartridge end cap 63. The mounting wheel 61 includes an outer rim 65 adapted for sliding fit within a larger diameter cylindrical bearing surface 53, and an extended hub 67 for sliding fit within a smaller cylindrical bearing surface 53a. The outer rim 65 of the mounting wheel includes a cylindrical rim extension 69. The mounting wheel 61 further includes a plurality of waste-water passages 66, these being, for example, the spaces between radial spokes of the wheel or simply an array of holes through the wheel. The sliding fit of the mounting wheel 61 within the cylindrical-bearing surface 53a of valve plate 51 is sealed by V seals 59a. The cartridge end cap 63 includes an integral pull handle 63a by which the cartridge is grasped for insertion or removal with respect to housing tube 52.

Filtration media, including an inner annular reverse osmosis membrane permeator 70 and an outer annular prefilter 72, are spirally wound on the permeator mounting tube 62, with an impermeable barrier layer 71 positioned between them to confine their respective flow paths, i.e., to prevent a liquid "short circuit" within the filter media. The mounting spoke wheel 61, by means of its cylindrical rim extension 69, is joined and sealed to the barrier 71 and forms a continuation of it to define separate water-flow passages between the filter media and the valve plate 51. The rim extension 69 of the mounting wheel 61 is only one convenient means to facilitate joining the mounting wheel to the impermeable barrier 71; it is not essential, however. The mounting wheel 61 might simply be abutted against the membrane permeator 70 and the impermeable barrier 71 wound around them both.

At the juncture with valve plate 51, the sealed outer rim 65 of mounting wheel 61 and the housing tube 52 form between them an annular feed-water passage 64 which communicates with the feed-water port 54 in the valve plate 51. The mounting wheel 61 itself includes a plurality of axial waste-water passages 66 leading directly to waste-water port 56 in the valve plate 51 and ultimately to drain. The central hub 67 of the spoke wheel 61 forms a central product-water passage 63 leading directly to product-water port 58 in the valve plate 51 and ultimately to a product-water reservoir.

At the other, second end of the cartridge, the end cap 63 and the ends of the membrane permeator 70 and prefilter 72 define an intermediate flow passage 74 for radial inward flow from the outlet, second (right) end of prefilter 72 to the inlet, second (right) end of membrane permeator 70. A suitable adhesive or other bonding means forms a bond and seal 79 between the end cap 63 and the prefilter 72.

The wall of the permeator mounting tube 62 includes a number of permeate flow apertures 73 spaced along its length and around its circumference for the inward flow of permeate water from the membrane permeator 70 into the mounting tube 62.

A cylindrical post-filter, generally indicated at 75, is positioned within the mounting tube 62. Post-filter 75 includes a body of granulated filter material 76 within a carrier tube 77 and with porous end disks 78 at each end holding the filter material in place. The filter material 76 is preferably granulated activated carbon, or charcoal, although other similar materials might be used, such as ground granular brass, ion-exchange resins or mixtures of granulated activated carbon or charcoal with either ground granular brass or ion-exchange resins. The end disks 78 may be formed of sintered metal such as bronze, or porous plastic such as polyethylene, an example being porous polyethylene, 0.100 -inch thick and of 20 -micron porosity. For function as bacteriological filter disks, the end disks 78 may be formed of fiber glass, an example being 0.100 -inch thick, of 3 -micron porosity, impregnated with quaternary ammonium functionality and positively charged. There may be one or more of each type of disk 78 at each end of the post-filter. In the example shown in FIG. 5, there is a single mechanical (porous plastic) disk 78 at the inlet end of the post-filter adjacent the cartridge end cap 63, and one mechanical and one bacteriological disk 78 at the outlet end adjacent the valve plate 51.

A lip seal cap 89, with axial projections 81, a radial seal 82 and a post-filter pull handle 83, fits over the end of the carrier tube 77 adjacent the product-water passage 68. Lip seal cap 89 serves to hold end disks 78 in place, to seal the adjacent end of the annular space 87 surrounding the carrier tube 77, and to insure a clearance space at the discharge end of the post-filter for discharge into the product-water passage 68. The post-filter pull handle 83 permits easy removal of the post-filter 75 from within the mounting tube 62 after the same is removed from the housing tube 52.

A spacer cap 84, with axial projections 85 and a plurality of radial tabs 86, fits over the end of the carrier tube 77 adjacent the cartridge end cap 63. Spacer cap 84 serves to hold end disk(s) 78 in place, to center the carrier tube 77 within the mounting tube 62, and to insure a clearance space at the inlet, second end of the post-filter for intake from the end permeate passage 88. Note that spacer cap 84 is not a seal; permeate water is free to flow axially from the annular space 87 around the carrier tube, past the spacer cap 84 and into the end permeate passage 88.

Prefilter

Prefilter 72 is of annular form and is an axial-flow filter medium or element. In its simplest form, some porous material such as cotton might be used. In its presently preferred embodiment, however, prefilter 72 is a spirally wound composite of a filter element, a spacer web, another filter element and another spacer web. Alternate spacer webs are sealed to the adjacent filter elements at one end, and the other alternate spacer webs are sealed to the adjacent filter elements at the other end. Thus, inflow channels at one end and outflow channels at the other end are not common channels; the water must traverse the interleaved filter elements to get from an inflow channel to an outflow channel. The filter elements are preferably of graded pore structure, 0.008 -inch thick and of 5-micron porosity, and may include either spun bonded and/or melt blown fibers such as polyester, polypropylene, polyethylene or nylon. The spacer webs are preferably of polyolefin netting of 0.018 -inch strand thickness, 0.035 -inch nodule thickness and 0.080 -inch pitch diameter pattern, or of epoxy-impregnated polyester tricot, 0.012 -inch thick, 34 wales per inch. The end sealant is preferably two-part polyurethane or a two part epoxy or an electromagnetically actuated polypropylene adhesive sealer or similar suitable sealing composition, so that the prefilter sealed end is liquid tight.

Wound prefilter modules have also used resin separator webs with ridges and grooves in a corrugated shape which separates successive windings of the filter medium. The grooves between successive corrugated ridges create longitudinal channels to admit inflow at one end and outflow of filtered liquid from the other. Many different materials may be used for separator webs and filter medium. Different ridge and groove shapes of the spacer web are also possible, and these can be varied to adjust the ratio by which the inflow volume exceeds the outflow volume. The preferred filter medium must be sufficient to remove, from a fluid stream, minute particles as small as 25 microns and preferably smaller down to 0.1 micron. Preferably, removal of particles nominally sized from 3 to 5 microns is the best balance between particle removal and life expectancy. Commonly made filter layers can be inorganic, such as alumina, silica, fiber glass or glass, or made from organic polymers such as nylon, Dacron, polyethylene or polypropylene, or of resins such as phenolic, vinyl chlorides or melamine. Animal fibers or vegetable fibers such as cellulose or cotton may also be used. These materials may be blended, if desired, and formed into filter material by well-known methods such as winding, felting, needling, flocculating, etc., the elements usually being held together by application of appropriate binders which are applied during filter-material fabrication. In addition, it is known to impregnate carbon into the filter material during fabrication. The fluid-impermeable separator web may comprise any flexible material sufficiently strong to prevent fluid passage even at high pressures. It is desirable that this layer, as well as the filter layer, be relatively thin to maximize filter surface area for a given filter volume. The separator material must be sufficiently pliable to permit crimping into corrugated form and widing it around a core without fracturing to prevent fluid passage even at high pressures. Particularly suitable fluid impermeable materials include polyesters such as polyethylene terephthalate, polyvinyl materials such as polyvinyl chloride and polyvinyl acetate or polyolefins such as polyethylenes and polypropylene.

Reverse Osmosis Membrane Permeator

The reverse osmosis membrane permeator 70 is a spiral winding of cellulosic reverse osmosis membrane. It can be fabricated with material known in the art to be useful as a semipermeable membrane. Examples of such membranes are disclosed in the aforementioned U.S Pat. Nos. 3,789,993, 3,792,135 and 3,824,299 to Brown and Ray. Other inorganic materials such as porous glass, sintered metals and ceramics may be used as the microporous substrate. Advantageously, microporous substrates prepared from organic materials in a known manner may be used. Examples of the organic materials include cellulose ester derivatives such as cellulose acetate, cellulose butyrate, cellulose propionate, cellulose acetate butyrate and cellulose triacetate; cellulose ether derivatives such as methyl cellulose, ethyl cellulose and ethyl ethyl cellulose; polysulfone derivatives such as polysulfone and sulfonated polysulfone and those described in U.S. Pat. Nos. 4,207,182, 4,026,977, 3,855,122 and 3,567,810; sulfonated polyphenylene oxide; phenolic resins and sulfonated phenolic resins; polyvinyl compounds such as polyacrylonitrile, polyvinyl butyral, halogenated vinyl polymers containing vinylidene fluoride such as those described in U S. Pat. No. 4,203,848 and halogenated vinyl polymers containing vinyl chloride; polyamides such as nylon poly(metaphenylene isophthalamide), poly(para-phenylene terephthalamide) and those described in U.S. Pat. No. 4,277,344; polyamide hydrazides such as the one obtained from meta-aminobenzoic hydrazide and terephthaloyl chloride; polyesters such as polyethylene terephthalate, polybutylene terephthalate or sulfonated polyethylene terephthalate, and polystyrenes.

Preferably, the substrate is used reinforced at its back with a woven or nonwoven cloth or the like. Examples of the woven or nonwoven cloth ar those of polyethylene terephthalate, polystyrene, polypropylene, nylon and vinyl chloride resins.

Operation

The function of the prefilter 72 is the initial removal of macroscopic impurities from the feed water. The primary function of the membrane permeator 70 is to exclude dissolved salts from the permeate water. The primary function of the post-filter 75 is to remove organics, such as dissolved hydrocarbon gases, by adsorption from the product water.

The filter media including prefilter 72, membrane permeator 70 and post-filter 75 are mounted on or in the mounting tube 62 which is, in turn, fastened to the cartridge end cap 63. Removal of the end cap 55 permits the removal of the cartridge end cap 63 by means of its pull handle 63a, and with it the winding tube 62 and all the filter media, from within the housing pipe for replacement from time to time as required. The post-filter pull handle 83 permits selective removal of the post-filter from the remainder of the filter cartridge should it be desirable to replace less than the entire filter cartridge 60.

In operation, the principal water-flow paths through this system are as follows: Feed water is admitted through the feed-water port 54 of the valve plate 51 to the annular feed-water passage 64 at the first end of the unit. Feed water flows axially from the annular feed-water passage 64 through the prefilter 72 to the intermediate flow passage 74 at the other, second end, and from there in a return axial direction through the reverse osmosis membrane permeator 70.

In the membrane permeator 70, a portion of the water permeates the membrane radially and spirally inward to the mounting tube 62 and through the permeate apertures 73 of mounting tube 62 into the annular space 87 surrounding the post-filter carrier tube 77. The permeate water then moves axially along the annular space 87, past the spacer cap 84 into the end permeate passage 88, and axially through the post-filter 75 into product-water passage 68 at the first end of the unit, at which point it is "product water". Product water flows from the product-water passage 68 into product-water port 58 in the valve plate 51 and from there through associated control valving to a product-water reservoir.

In the membrane permeator 70, water not permeating the membrane flows axially along the membrane and through waste-water flow passages 66, at which point it is "waste water". Waste water flows from the waste-water flow passages 66 into waste-water port 56 in the valve plate 51 at the first end of the unit, and from there through associated control valving and to drain.

Advantages

The reverse osmosis membrane cartridge herein described has several significant advantages. Replacement of all filter media can be accomplished by simple removal and replacement of a single cartridge. Optional removal and replacement of only the post-filter is possible, also by a simple procedure. Upon replacement, the new unit automatically replaces all cartridge seals. The removal of end cap from the housing tube 50 provides all necessary access to the interior of the unit without the need to disconnect piping. The nested "packaging" of the components minimizes the space required by the unit. The three components of the filter cartridge, namely, the prefilter, the reverse osmosis membrane and the post-filter, can be designed and sized for a particular useful life, depending upon the anticipated use of individual components.

We claim:

1. A water filter cartridge having first and second ends and including:
    a prefilter of annular form adapted for flow of feed water generally axially therethrough from said first end to said second end;
    a tubular impermeable barrier surrounding the outer surface of the prefilter;
    a reverse osmosis filter including a membrane wound on a winding tube through which permeate may pass to the interior of the winding tube, and an impermeable barrier layer surrounding the outer surface of said membrane, said reverse osmosis filter being of annular form in section and disposed radially within said prefilter;
    a post-filter comprising granular filter material disposed radially within said reverse osmosis filter; and
    means for leading permeate to the granular filter material at said second end;
    the arrangement being such that feed-water which enters said prefilter at said first end may leave the prefilter at the second end and may thereafter enter the reverse osmosis filter at the second end, and that waste water leaves the reverse osmosis filter at said first end and the permeate, after passing through said winding tube and passing to said post-filter at said second end, leaves said post-filter at said first end.

2. A water filter cartridge as claimed in claim 1, wherein said post-filter further includes a carrier tube within which said granular filter material is disposed.

3. A water filter cartridge as claimed in claim 2, including an annular space between said winding tube and said carrier tube for flow of permeate having passed through the winding tube, to the second end of said post-filter.

4. A water filter cartridge as claimed in claim 3, including a seal between said carrier tube and said winding tube so disposed as to prevent flow of permeate in said annular space to said first end.

5. A water filter cartridge as claimed in claim 1, wherein said means for leading permeate to the granular material at said second end includes a cap sealed to said winding tube at said second end.

6. A water filter cartridge as claimed in claim 2, 3 or 4, including a cap sealed to the second end of said carrier tube, and a valve selectively allowing flow of permeate to the granular material.

7. A water filter cartridge as claimed in any one of claims 1 to 5, including means at the first end of the cartridge sealed to the winding tube and the barrier layer surrounding the outer surface of the membrane for isolating feed water from waste water and waste water from permeate.

8. Water filtration apparatus including a water filter cartridge as claimed in claim 7, said apparatus including a housing tube permanently closed at a first end by a valve plate and closed at the second end by a removable end cap, said valve plate having ports for connection to a feed water supply, a drain and a connection to a reservoir for permeate, and having means for cooperating with said means at the first end of the cartridge sealed to the winding tube and the barrier layer whereby only feed-water can enter said prefilter and only permeate flows to said connection to a reservoir for permeate, having means for cooperating with said means at the first end of the cartridge sealed to the winding tube.

* * * * *